US011650551B2

(12) United States Patent
Jha et al.

(10) Patent No.: US 11,650,551 B2
(45) Date of Patent: May 16, 2023

(54) SYSTEM AND METHOD FOR POLICY OPTIMIZATION USING QUASI-NEWTON TRUST REGION METHOD

(71) Applicant: Mitsubishi Electric Research Laboratories, Inc., Cambridge, MA (US)

(72) Inventors: Devesh Jha, Cambridge, MA (US); Arvind Raghunathan, Brookline, MA (US); Diego Romeres, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 773 days.

(21) Appl. No.: 16/592,977

(22) Filed: Oct. 4, 2019

(65) Prior Publication Data
US 2021/0103255 A1    Apr. 8, 2021

(51) Int. Cl.
*G05B 13/02* (2006.01)
*G05B 13/04* (2006.01)
(Continued)

(52) U.S. Cl.
CPC ....... *G05B 13/029* (2013.01); *G05B 13/0265* (2013.01); *G05B 13/042* (2013.01);
(Continued)

(58) Field of Classification Search
CPC .............. G05B 13/029; G05B 13/0265; G05B 13/042; G05B 13/047; G06N 3/08;
(Continued)

(56) References Cited

U.S. PATENT DOCUMENTS

2015/0142205 A1* 5/2015 Harsham ............. B60W 50/085
701/1

FOREIGN PATENT DOCUMENTS

WO    2019012437    1/2019

OTHER PUBLICATIONS

Furmston et al. "Approximate Newton Methods for Policy Search in Markov Decision Processes." Journal of Machine Learning Research 17 (2016) 1-51 Submitted Aug. 2015; Revised Nov. 2016; Published Dec. 2016.

(Continued)

*Primary Examiner* — Tejal Gami
(74) *Attorney, Agent, or Firm* — Gennadiy Vinokur; Hironori Tsukamoto

(57) ABSTRACT

A computer-implemented learning method for optimizing a control policy controlling a system is provided. The method includes receiving states of the system being operated for a specific task, initializing the control policy as a function approximator including neural networks, collecting state transition and reward data using a current control policy, estimating an advantage function and a state visitation frequency based on the current control policy, updating the current control policy using the second-order approximation of the objective function, a second-order approximation of the KL-divergence constraint on the permissible change in the policy using a quasi-newton trust region policy optimization, and determining an optimal control policy, for controlling the system, based on the average reward accumulated using the updated current control policy.

27 Claims, 13 Drawing Sheets

(51) Int. Cl.
    *G06N 20/00*     (2019.01)
    *G06N 3/08*     (2023.01)
    *G06N 7/01*     (2023.01)

(52) U.S. Cl.
    CPC ............ *G05B 13/047* (2013.01); *G06N 3/08* (2013.01); *G06N 7/01* (2023.01); *G06N 20/00* (2019.01)

(58) Field of Classification Search
    CPC ........ G06N 7/005; G06N 20/00; G06N 3/006; B25J 9/163
    See application file for complete search history.

(56) References Cited

OTHER PUBLICATIONS

Xu et al. "Stochastic Variance Reduction for Policy Gradient Estimation." arXiv:1710.06034v4 [cs.LG] Mar. 29, 2018.

\* cited by examiner $$\pi_\theta = argmax_\theta \, E_{\pi_\theta}\left[\sum_{t=0}^{\infty} \gamma^t r_t\right]$$

Control Policy

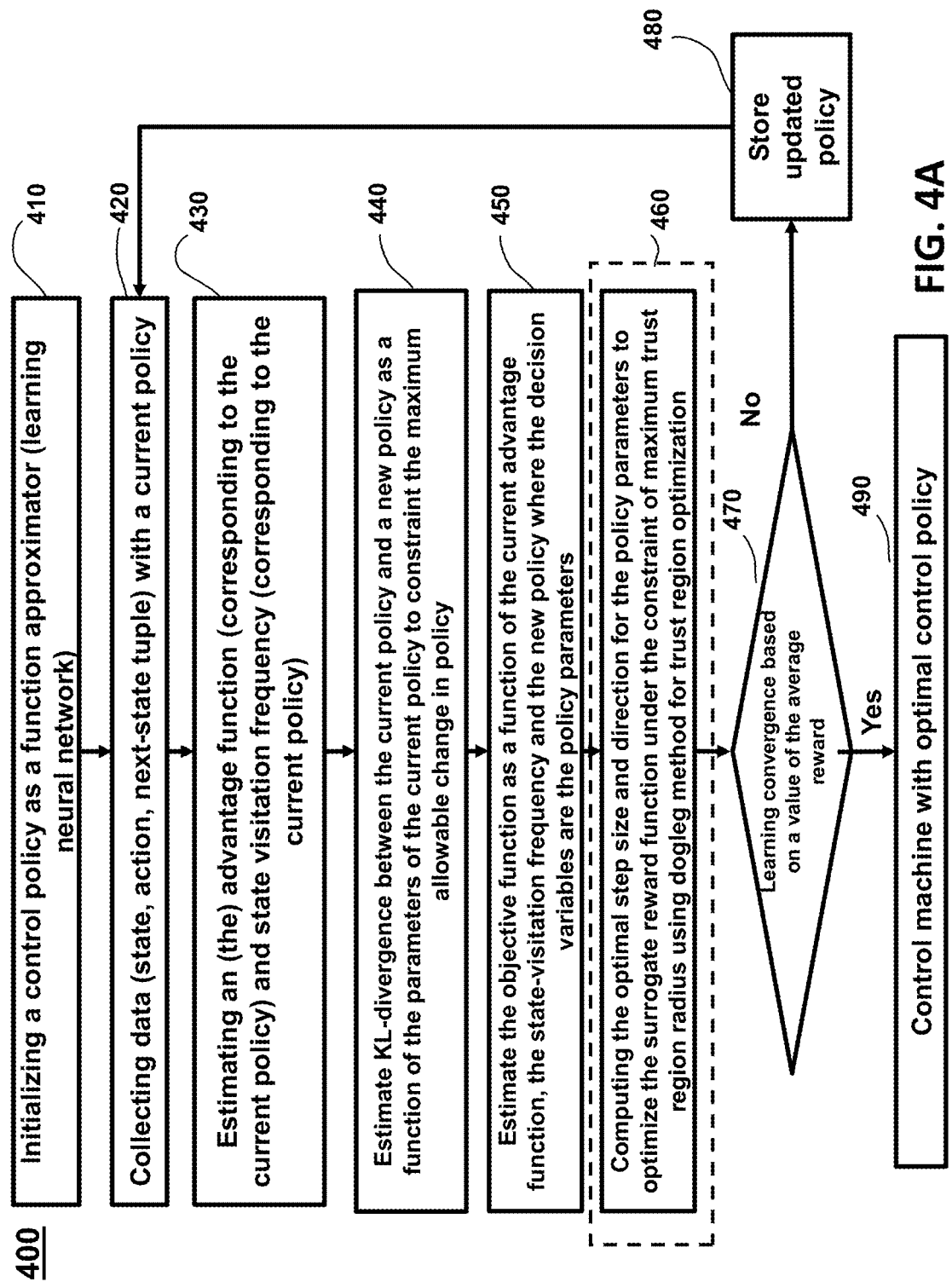

Algorithm 1: Dogleg Method

Data: $\nabla f_k, B_k, F_k, \delta_k$
Result: Dogleg direction $\Delta \theta_k^{DL}$ Compute QN direction $\Delta \theta_k^{QN} = -B_k^{-1} \nabla f_k$;
if $(\Delta \theta_k^{QN})^T F_k (\Delta \theta_k^{QN}) \leq \delta_k$ then
    return $\Delta \theta_k^{QN}$
end

Compute Gradient direction $\Delta \theta_k^{GD} = -\beta_k F_k^{-1} \nabla f_k$ where $\beta_k$ is defined in (3);
if $(\Delta \theta_k^{GD})^T F_k (\Delta \theta_k^{GD}) \geq \delta_k$ then
    return $\sqrt{\frac{\delta_k}{(\Delta \theta_k^{GD})^T F_k (\Delta \theta_k^{GD})}} \Delta \theta_k^{GD}$
end

Find largest $\tau_k \in [0, 1]$ such that $\Delta \theta(\tau_k) := (\Delta \theta_k^{GD} + \tau_k (\Delta \theta_k^{QN} - \theta_k^{GD}))$ satisfies $(\Delta \theta(\tau_k))^T F_k (\Delta \theta(\tau_k)) = \delta_k$;
return $(\Delta \theta_k^{GD} + \tau_k (\Delta \theta_k^{QN} - \theta_k^{GD}))$;

FIG. 6

Algorithm 2: Quasi-Newton Trust Region Method (QNTRM)

Data: Parameters of algorithm — $0 < \nu < \bar{\nu} < 1, \delta \in (0,1), \kappa \in (0,1), 0 < \underline{\omega} < 1 < \bar{\omega}$.
Data: Initial policy parameters — $\theta_0$
Data: Convergence tolerance — $\epsilon > 0$, Limit on iterations $K$
Result: $\theta^*$
Set $k = 0$;
while $\|\nabla f_k\| > \epsilon$ *and* $k < K$ do
    Compute the Dogleg step $\Delta\theta_k^{DL}$ using Algorithm 1;
    Compute $\nu_k = \frac{f(\theta_k + \Delta\theta_k^{DL}) - f(\theta_k)}{\tilde{f}_k(\theta_k + \Delta\theta_k^{DL}) - \tilde{f}_k(\theta_k)}$;
    if $\nu_k \geq \nu$ then
        Set $\theta_{k+1} = \theta_k + \Delta\theta_k^{DL}$;
        if $\nu_k \geq \bar{\nu}$ *and* $(\Delta\theta_k^{DL})^T F_k (\Delta\theta_k^{DL}) = \delta_k$ then
            Set $\delta_{k+1} = \min(\delta, \bar{\omega}\delta_k)$;
        end
    else
        Set $\theta_{k+1} = \theta_k$;
        Set $\delta_{k+1} = \underline{\omega}\delta_k$;
    end
    Set $s_k = \Delta\theta_k^{DL}$ and $y_k = \nabla f(\theta_k + \Delta\theta_k^{DL}) - \nabla f(\theta_k)$;
    if $s_k^T y_k \geq \kappa$ then
        Update $B_{k+1}$ using (2);
    else
        Set $B_{k+1} = B_k$;
    end
    Set $k = k + 1$;
end
return $\theta^* = \theta_k$

FIG. 7

Algorithm 3: QNTRPO

Initialize policy parameters $\theta^0$ for $i = 0, 1, 2, \ldots$, *until convergence* do
  Compute all Advantage values $A_{\pi_{\theta^i}}(s, a)$ and state-visitation frequency $\rho_{\theta^i}$;
  Define the objective function for the episode $L_{\theta^i}(\theta) = -f^i(\theta)$;
  Obtain $\theta^{i+1}$ using QNTRM to minimize $f^i(\theta)$ with initial policy parameters $\theta_0 = \theta^i$ end

FIG. 8

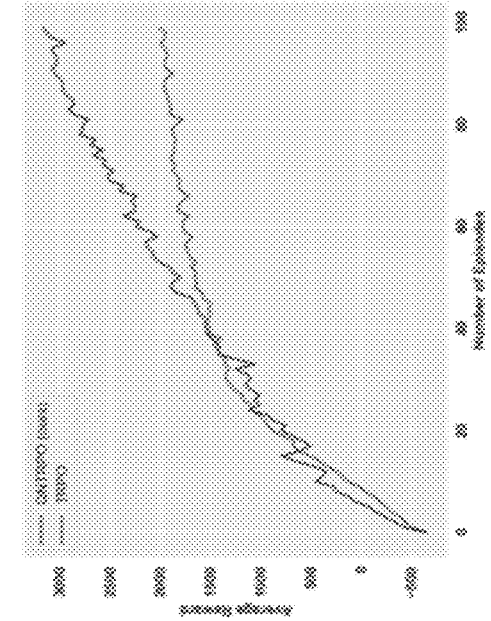
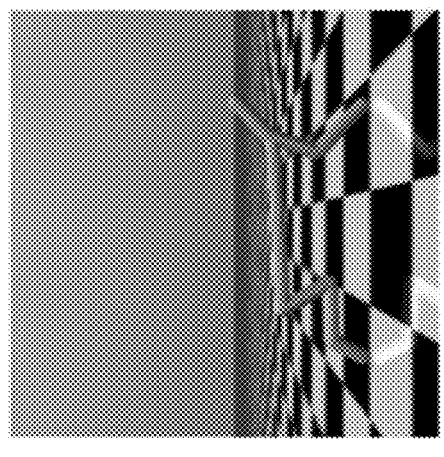
FIG. 9B
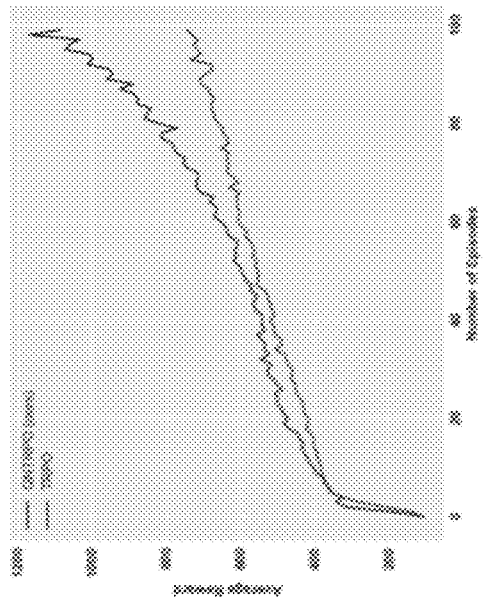
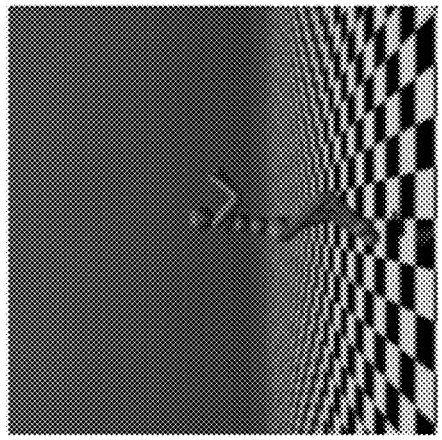
(a) Humanoid-v2
FIG. 9A

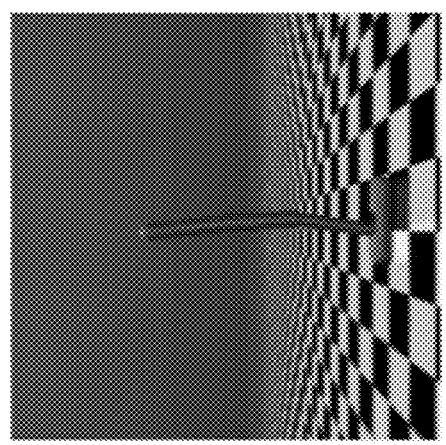
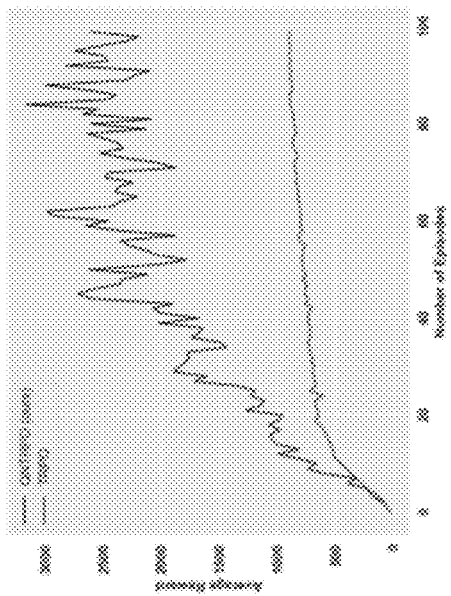
FIG. 9C
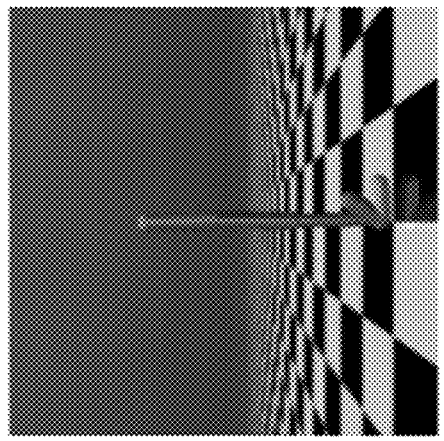
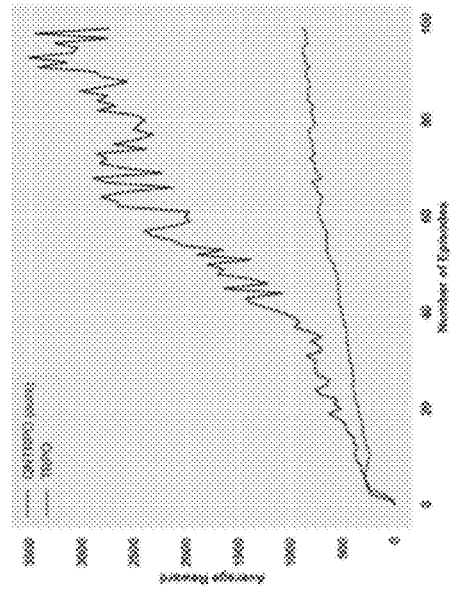
FIG. 9D

| Task | State Dimension | Action Dimension |
|---|---|---|
| Humanoid-v2 | 376 | 17 |
| Half-Cheetah-v2 | 17 | 6 |
| Walker2d-v2 | 17 | 6 |
| Hopper-v2 | 11 | 3 |

FIG. 10

SYSTEM AND METHOD FOR POLICY OPTIMIZATION USING QUASI-NEWTON TRUST REGION METHOD

FIELD OF THE INVENTION

The invention relates generally to system and method for optimizing a policy for Reinforcement Learning, and more particularly to a system and a method for Policy Optimization using Quasi-Newton Trust Region Method.

BACKGROUND OF THE INVENTION

Reinforcement Learning (RL) is a learning framework that handles sequential decision-making problems, wherein an ' agent' or decision maker learns a policy to optimize a long-term reward by interacting with the (unknown) environment. At each step, an RL agent obtains evaluative feedback (called reward or cost) about the performance of its action, allowing it to improve (maximize or minimize) the performance of subsequent actions. Recent research has resulted in remarkable success of these algorithms in various domains like computer games.

Reinforcement learning algorithms can be broadly divided into two categories—Model-based methods and model-free methods. Model-based Reinforcement Learning (MBRL) techniques are generally considered to be data-efficient as they learn a task-independent predictive model for the system. The learned model is then used to synthesize policies for the system using stochastic control approaches (see End-to-End training of deep visuomotor policies by Levine et. al., The Journal of Machine Learning Research, vol-17, number-1, pages-1334-1373, year-2016). However, these methods are generally very hard to train and thus result in low-performance policies. The model-free techniques are classified in two group: value-based approaches where a value-function for the underlying Markov Decision Process (MDP) is synthesized while learning the policy and the policy gradient algorithms where a function approximator is used to directly maximize the cumulative reward for the system.

Policy gradient algorithms can directly optimize the cumulative reward and can be used with a lot of different non-linear function approximators including neural networks. Consequently, policy gradient algorithms are appealing for a lot of different applications, and are widely used. However, several problems remain open including monotonic improvement in performance of the policy, selecting the right learning rate (or step-size) during optimization, etc. Monotonic improvement of the policies is important for better sample efficiency of the algorithms. Better sample efficiency of these algorithms would allow use of policy gradient algorithms for RL in physical systems and other domains where data collection could be costly.

Most of the recent methods for policy gradient use deep neural networks (DNN) as function approximators to represent the policy. The goal of training is to find the optimal set of parameters of the DNN so that the corresponding policy achieves the optimal performance. Performance is measured by the reward accumulated by the system while using a certain policy. This is achieved using an iterative training process where the current policy is implemented on the data in an episodic fashion to collect data and then a new set of parameters for the DNN is computed using gradient descent methods. Ensuring monotonic improvement of the policy using gradient-descent methods is a very challenging problem. Some recent methods have proposed a mathematical formulation for monotonic improvement in performance of the policy gradient algorithms using a trust-region optimization formulation for computing the new parameters of the DNN during the iterative training process (see Trust Region Policy Optimization by Schulman et. al., International Conference on Machine Learning, 2015, pages-1889-1897). However, the proposed method relies on a linear model of the objective function and quadratic model of the constraints to determine a candidate search direction. A simple linesearch is employed for obtaining a stepsize that ensures progress to a solution. Consequently, this results in a scaled gradient descent algorithm and is not a trust region algorithm. More importantly, these methods do not inherit the flexibility and convergence guarantees provided by the trust region framework.

Consequently, there is a requirement for an improved algorithm for finding the step for the policy gradient algorithms using improve trust region methods for constrained optimization that can incorporate the curvature information of the objective function. The current disclosure presents a quasi-Newton method for computing the step during policy optimization that can find better policies for monotonic improvements in the performance of the policy.

SUMMARY OF THE INVENTION

Some embodiments of the present disclosure are based on recognition that a computer-implemented learning method is provided for optimizing a control policy controlling a system. Some examples of such systems may be systems including mechanical systems like HVAC systems, factory automation systems, robotic systems, and high-performance induction motors, etc. In this case, the method may include receiving states of the system being operated by a task-specific policy; initializing the control policy as a function approximator including neural networks; collecting data which may include the tuple of current state, action and the next state using a current control policy; estimating an advantage function and a state visitation frequency based on the current control policy; computing the Hessian of the objective function using a BFGS method; a Dogleg method for computing the step using the constraint on the KL-divergence between the current and updated policy parameters; updating the current control policy in an iterative fashion using the steps computed by the Dogleg method using a quasi-Newton trust region method (QNTPM) where the trust region radius is updated iteratively based on how well the quadratic model can approximate the original optimization function; and determining an optimal control policy, for controlling the system, based on the convergence criterion of the value of the advantage function for the current control policy.

Furthermore, another embodiment of the present invention can provide a controller (control system) for controlling a system by optimizing a control policy. The system may include an interface configured to receive task commands and states of the system via sensors; a memory to store computer-executable programs including an initializer, a policy collector, an estimator, an agent and an policy-update program, a Dogleg method, and a Quasi-Newton approximation program for estimating the Hessian of the objective; and a processor, in connection with the memory, configured to initialize the control policy as a function approximator including neural networks; collect data with respect to the states using a current control policy; estimate an advantage function and a state visitation frequency based on the current control policy; computing the Hessian of the objective function using a BFGS method; a Dogleg method for computing the step using the constraint on the KL-divergence between the current and updated policy parameters; updating the current control policy in an iterative fashion using the steps computed by the Dogleg method using a quasi-Newton trust region method (QNTPM) where the trust region radius is updated iteratively based on how well the quadratic model can approximate the original optimization function; and determine an optimal control policy, for controlling the system, based on the convergence criterion of the value of the advantage function for the current control policy.

In another embodiment of the invention, the Quasi-Newton approximation program uses a limited-memory version to store the estimate of the Hessian of the objective. This is called the limited-memory Quasi-Newton approximation. The limited-memory Quasi-Newton approximation estimates the Hessian of the objective function using a sum of a set of outer products of a few vectors thereby saving considerable memory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4A shows a flowchart that details the different steps of the Quasi-Newton Trust region policy optimization, according to embodiments of the present disclosure;

FIG. 6 shows an algorithm describing the exact and dogleg approximation for the trust region optimization, according to embodiments of the present invention, according to embodiments of the present invention;

FIG. 7 is an algorithm describing QNTRM for the trust region optimization, according to embodiments of the present invention;

FIG. 8 is an algorithm describing the exact and QNPRTO for the trust region optimization, according to embodiments of the present invention;

FIGS. 9A, 9B, 9C and 9D are simulation results for example benchmarks for the trust region optimization, according to embodiments of the present invention; and FIG. 10 shows the dimension or size of the benchmark problems shown in the present invention to show the sample efficiency of the optimization method.

Figure 1A:
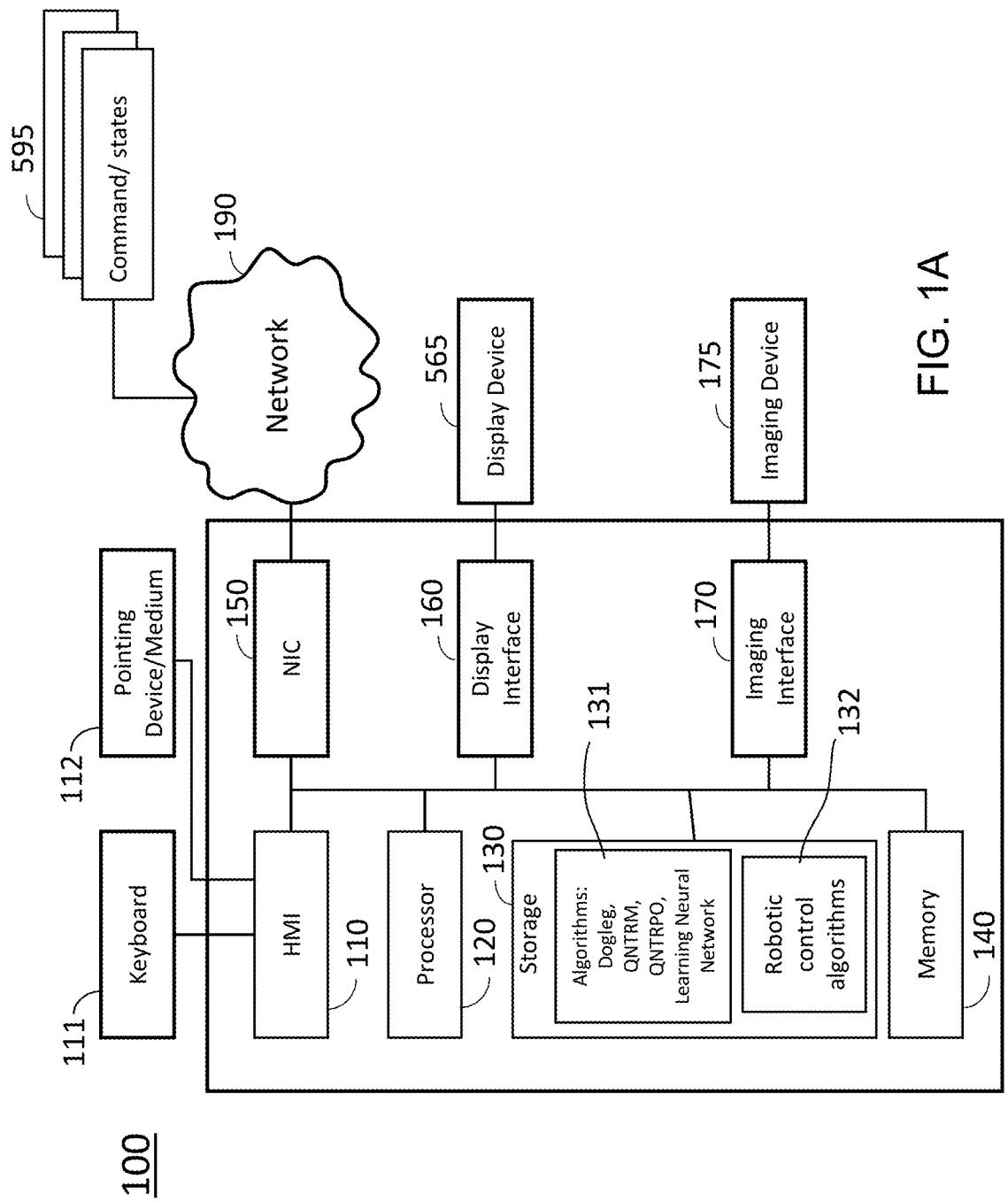
FIG. 1A is a diagram illustrating a control system (controller) for controlling a mechanical system (device, e.g., robots) based on the quasi-newton trust region policy optimization, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIG. 1A shows a block diagram of a control system (controller) 100 according to some embodiments of the present invention. The system 100 can include a human machine interface (HMI) with input/output (I/O) interface 110 connectable with a keyboard 111 and a pointing device/medium 112, a 3D sensor (not shown), a processor 120, a storage device 130 storing algorithms to be performed with a memory 140 and the processor 120, a network interface controller 150 (NIC) connectable with a network 190 including local area networks and internet network (not shown), a display interface 160 connected to a display device 565, an imaging interface 170 connectable with an imaging device 175. The NIC may include a transceiver (not shown) to perform wireless communications for receiving commands and state measurement data. The HMI with I/O interface 110 may include analog/digital and digital/analog converters. The HMI with I/O interface 110 may also include a wireless communication interface that can communicate with other 3D point cloud display systems or other computers via wireless internet connections or wireless local area networks, which enable to construct multiple 3D point clouds. The system 100 can include a power source (not shown). The power source may be a battery rechargeable from an external power source (not shown) via the I/O interface 110. Depending upon the application the power source may be located outside of the system 100.

The system 100 can receive electric text/imaging documents 195 including speech data via the network 190 connected to the NIC 150. The storage device 130 includes algorithm modules 131 including the Dogleg method, Quasi-Newton Trust Region Method (QNTRM) and Quasi-Newton Trust Region Policy Optimization (QNTRPO) are stored into the storage 130 as program code data, and device control algorithms 132. The algorithms of the models 131 may be stored to a computer readable recording medium (not shown) so that the processor 120 can execute the algorithms of the models 131-132 and multimodal encoder-decoders 200 by loading the algorithms from the medium. Further, the pointing device/medium 112 may include modules that read and perform programs stored on a computer readable recording medium.

Figure 1B:
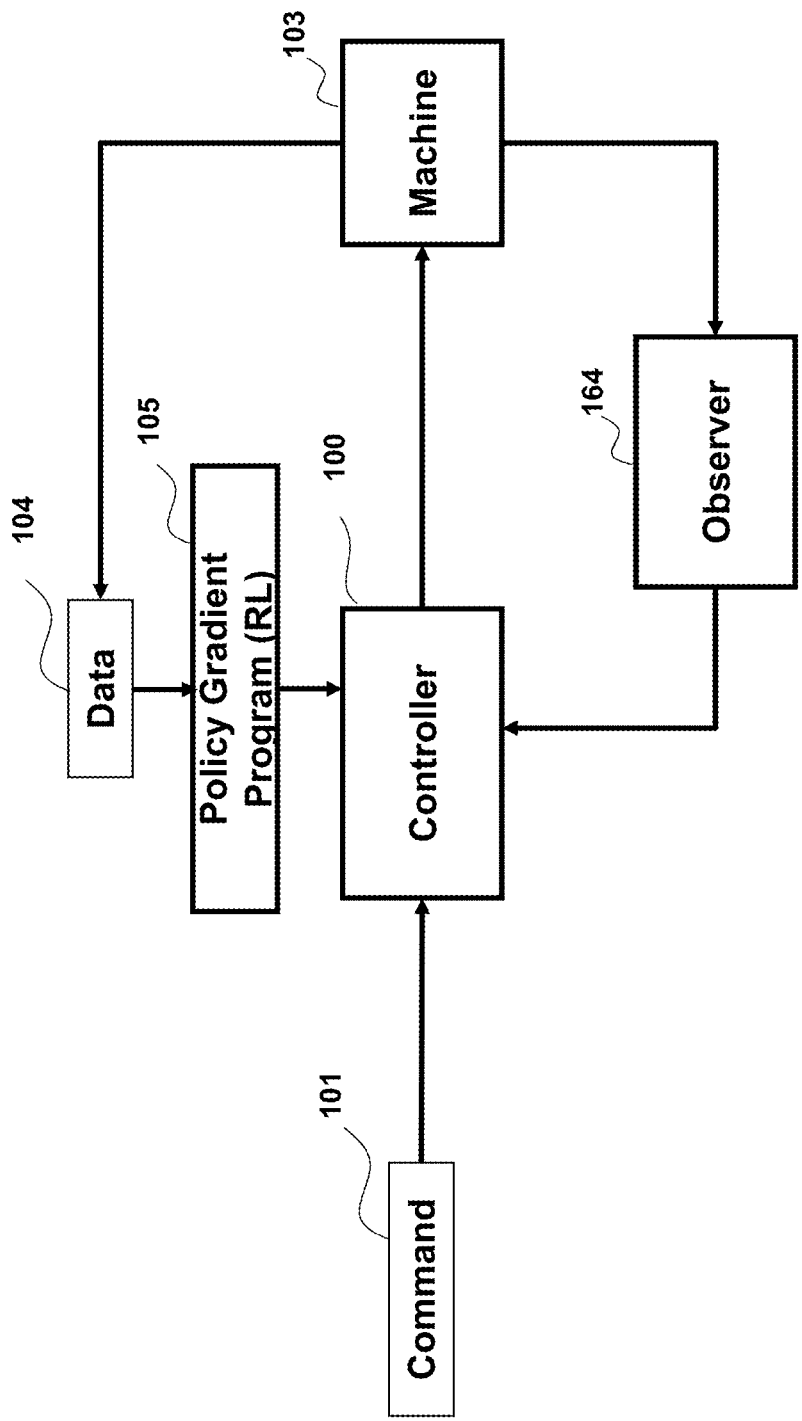
FIG. 1B is a diagram illustrating a data processing flow using the controller (control system), according to embodiments of the present invention.

FIG. 1B is a diagram illustrating a data processing flow using the controller (control system) 100, according to embodiments of the present invention. Some embodiments of the present disclosure are based on the realization that a controller 100 for a machine 103 can be designed to achieve a particular command or task 101. A controller 100 is a computer software that sends control signals to a machine 103 which implements the control signal and the state of the machine is observed by the observer 164. Some embodiments of the disclosure are based on the realization that a Reinforcement Learning algorithm or more specifically a policy gradient algorithm 105 can be used to learn an optimal policy for the controller 100 using operational data 104 obtained from the machine. For a particular task or command, the controller is initialized with an initial policy which determines a control signal based on the current state of the machine. The state of the machine can be observed by the observer. This control signal is then implemented on the machine and the state transition of the machine is observed. This tuple of current state, control signal and the next state is the data that is used by the policy gradient algorithm algorithm to compute a new policy for executing the command or task. This process is then repeated till the policy converges to a stable policy (i.e, one that doesn't change up on collection of more data).

Figure 2:
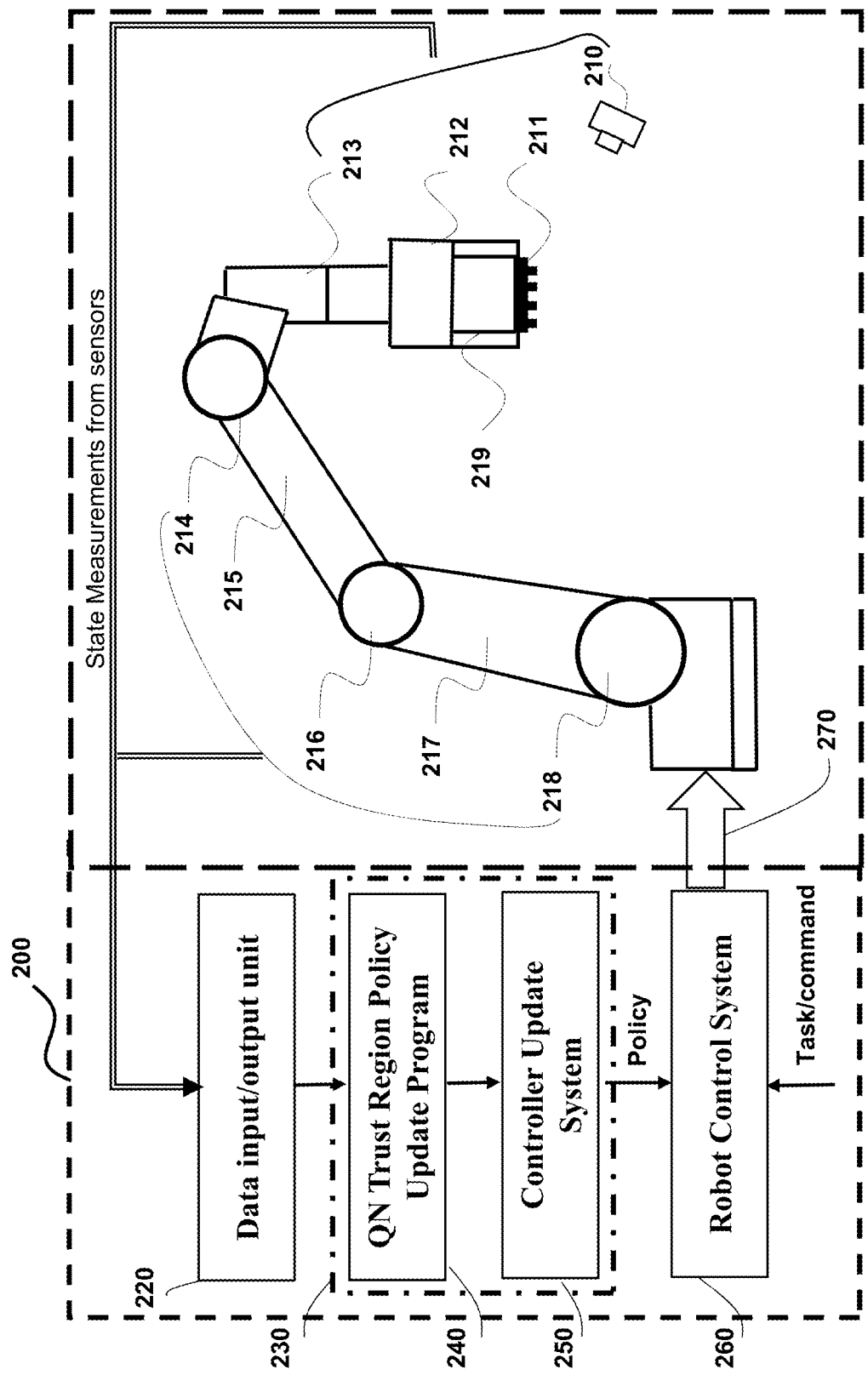
FIG. 2 is a diagram illustrating an example of a system based on the proposed quasi-Newton trust region optimization, according to embodiments of the present invention.

FIG. 2 is a diagram illustrating an example of a control system based on the proposed quasi-Newton trust region optimization, according to embodiments of the present invention. In the following, the control system is described as an example that are applied to a robotic system 200, however it should be noted that a control system and a computer-implemented method according to the present invention are not limited to the robotic systems. Some systems or computer-implemented method according to the present invention can be introduced to systems including mechanical systems like HVAC systems, factory automation systems, robotic systems, and high-performance induction motors, etc.

The robotic system 200 in the FIG. 2 may include a robotic manipulator equipped with sensors for state measurements and a computer-instrumented system for storing data and controlling the manipulator arm. The manipulator arm may include several rigid links 217, 215, 213 and joints 218, 216, 214. The manipulator arm is controlled using a robot control system that receives a command or task that is externally supplied to the system. An example of the command or task could be grasping an object 212 using the manipulator or performing an assembly operation using the objects 211 held by the gripper 212. The robot control system sends a control signal 270 to the manipulator. The control signal 270 could be the torques to be applied at each of the joints 218, 216, 214 of the manipulator and opening/closing of gripper 212. The state of the robotic system is measured using sensors. These sensors may include encoders at the joints of the robot 218, 216, 214, a camera 210 that can observe the environment of the robot and some tactile sensors 219 that can be attached to the jaws of the gripper 212. The state measurements from sensors are sent to a data input/output unit 220 which stores the data received from the sensors. Some embodiments of the disclosure initialize the robot control system with an initial control policy for a desired task. Several episodes of the control policy is implemented on the robotic system and the state measurement data from the sensors is collected in a data input/output system 220. This data is then used by a software containing a computer program 230 for updating the current policy of the robotic system. The program for updating the policy may be the Quasi-Newton Trust region method (QNTRM) program 240 for computing a step for the parameters of the policy using the Dogleg method. This step computed by the QNTRM is then passed to a program 250 that performs update of the policy using the computed step. The controller update system 250 then sends the updated policy to the robot control system 260. This process is repeated till the optimal policy for control of the robot is reached.

Figures 3A, 3B:
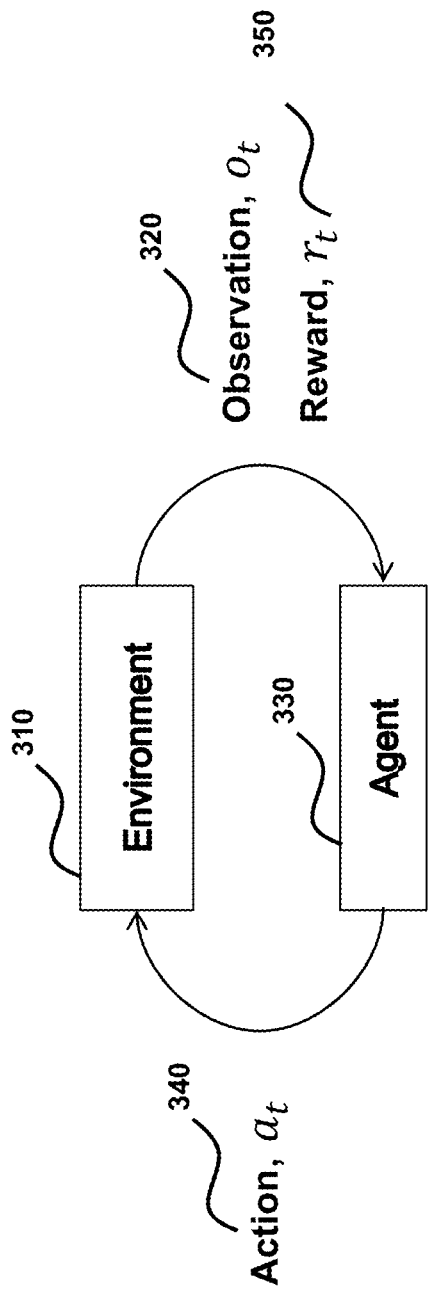
FIG. 3A is a diagram illustrating the general idea of reinforcement learning, according to the embodiments of the present disclosure.
FIG. 3B is a diagram illustrating the mathematical representation of the policy that an agent is trying to learn, according to the embodiments of the present invention.

FIG. 3A is a diagram illustrating the general idea of reinforcement learning, according to the embodiments of the present disclosure. Reinforcement Learning (RL) is a learning framework that handles sequential decision-making problems, wherein an ' agent' 330 or decision maker learns a policy to optimize a long-term reward by interacting with the (unknown) environment 310. At each step, an RL agent obtains evaluative feedback (called reward or cost) 350 about the performance of its action 340 along with an observation of the environment, allowing it to improve (maximize or minimize) the performance of subsequent actions.

FIG. 3B is a diagram illustrating the mathematical representation of the policy that an agent (shown in FIG. 3A) is trying to learn, according to the embodiments of the present disclosure. In policy gradient algorithms for reinforcement learning, the policy for the agent is parameterized by a set of parameters $\theta$. And the state dependent control policy 370 is generally represented as $\pi_\theta$. The set of parameters $\theta$, can represent, for example, the weights of the neurons of a deep neural network. The control policy is found by the maximizing the expected discounted reward 360. Since the policy is a function of the parameters θ of the function approximator representing the policy, the optimal policy is found by estimating the parameters θ that maximize the expected discounted reward for the system. The objective of policy gradient algorithms is to optimize the parameters θ of the control policy $\pi_\theta$ using a suitable algorithm. The de-facto algorithm used for finding the optimal parameters θ is gradient descent where the gradient of the objective function is used to compute a sequence of new parameters till a condition for convergence is reached. The objective function for policy gradient algorithms is the expected discounted reward. However, using a simple gradient descent algorithm for computing the parameters θ results in several undesirable consequences such as high variance in expected return, slower learning, etc. In the current disclosure, the QNTRPO-based step computation for policy updates allows us to achieve faster learning rate and better sample efficiency.

FIG. 4A shows a flowchart that details the different steps of the Quasi-Newton Trust region policy optimization, according to embodiments of the present disclosure. According to some embodiments of the present invention, a computer-implemented learning method for optimizing a control policy controlling a system may include a steps of receiving states of the system being operated for a specific task or command. The initial policy for controlling the system is first initialized with a function approximator (e.g., neural networks) 410. In the rest of this description, we will assume that the function approximator is a neural network. The goal of the learning process is to optimize the parameters of the neural network so that the expected rewards accumulated by the policy is maximized over the entire state space. Since it might be practically challenging to estimate the rewards over the state-space of the system, most algorithms approximate it by using computing average reward over several episodes of the system using the current policy. As such some embodiments of the present disclosure consists of a step of collecting data using the current policy 420.

The data collected using the current policy is used to estimate the advantage function and state-visitation frequency for the policy 430. The present disclosure uses the KL-divergence between the current policy and a new policy to constraint the amount of change during the iterative learning process. Thus some embodiments of the present disclosure consist of a step 440 of computing the KL-divergence between the current policy and the new policy parameters. Note that the policy parameters are the decision variables for the policy optimization process. In policy gradient algorithms, an estimate of the objective function changes depending on the policy used to collect the data and estimate the expected average reward. Thus, some embodiments of the present disclosure consist of a step 450 to estimate the surrogate reward function using the advantage function, the state-visitation frequency and the new policy. Note that the decision variables for the optimization are the new policy parameters that appear in the surrogate objective function.

Policy is updated in the next step by estimating the new parameters for the policy using the QNTRM policy optimization step 460. The learning process is terminated if the convergence criterion for learning 470 is reached—in that case, the machine is then controlled optimally using the optimal policy 490. The convergence criterion is generally based on convergence of the average reward of the policy. When the average reward for the policy gradient algorithm reaches steady state, the learning process is terminated. If the learning has not converged, the updated policy is stored in step 480, and the whole process is then repeated until convergence.

Figure 4B:
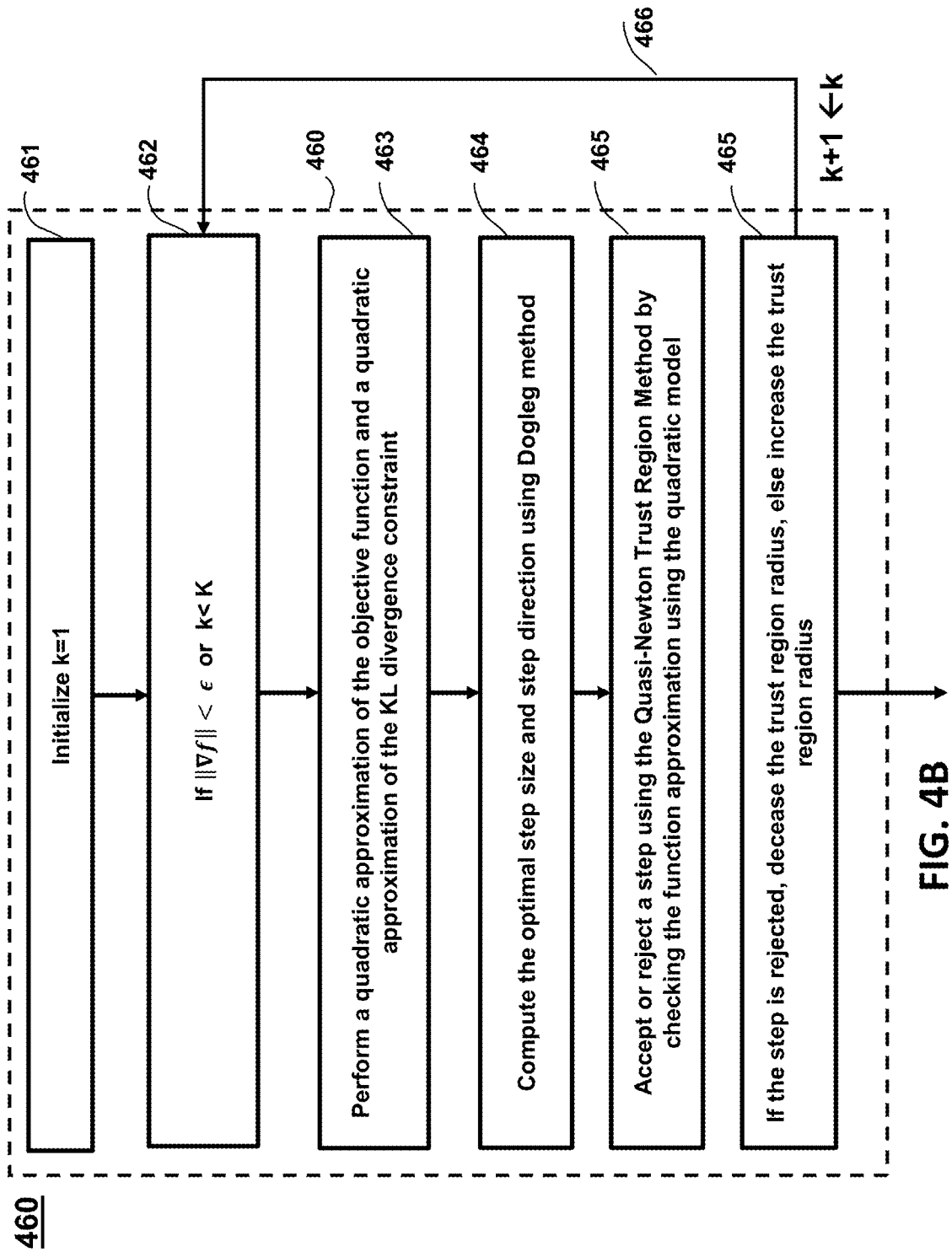
FIG. 4B shows a flowchart that provides the different steps of the Quasi-Newton trust region method for computing a step of the trust region policy optimization problem using Dogleg Method, according to embodiments of the present disclosure.

FIG. 4B shows a flowchart for estimating the new parameters of the policy using the Quasi-Newton Trust Region Method (QNTRM). The new parameters corresponding to the update of the policy is computed in an iterative fashion. Thus some embodiments of the present disclosure may initialize an iterate counter 'k' in step 461. Furthermore, some embodiments of the disclosure check if the step computation can be terminated in step 462. The proposed method for policy optimization in the present disclosure makes use of the curvature information of the objective function to finding the new set of decision variables, i.e., the policy parameters. As a result, some embodiments of the present disclosure, in step 463, estimate the second-order approximation of the objective function using Quasi-Newton method and the second-order approximation of the KL-divergence constraint. Note that the proposed method uses KL-divergence between the current policy and the new policy as a constraint to perform a trust-region optimization. The second-order approximation of the objective function and the constraint is used to compute the step of the trust-region optimization using the Dogleg method. Some embodiments of the present disclosure, in step 464, compute the size and direction of a step of optimization using Dogleg method. The step computed by the Dogleg method is accepted or rejected by making a check on how well the function approximates the objective function using the second-order approximation and the new step computed from Dogleg method. This is done in step 465 of some embodiment of the disclosure. If the step computed by the Dogleg method is rejected, then the trust region radius is decreased as the function can't be approximated well in the trust region radius. Otherwise, when the step is accepted, then the trust region radius can be increased to take bigger steps for optimization. Consequently, some embodiments of the present disclosure optimize the step computed by the Dogleg method in an iterative fashion 466 in step 465. Note that this iteration optimizes a single step of the policy gradient method using the data collected in one episode of the algorithm.

In the rest of the disclosure, we describe in detail the QNTRM for policy optimization.

Notation

We address policy learning in continuous/discrete action spaces. We consider an infinite horizon Markov decision process (MDP) defined by the tuple (S, A, P, r, γ), where the state space S is continuous, and the unknown state transition probability P:S×S×A→[0,1] represents the probability density of the next state $s_{t+1} \in$ S given the current state $s_t \in$ S and action $a_t \in$ A and γ is the standard discount factor. The environment emits a reward r:S×A→R on each transition.

Let π denote a stochastic policy π:S×A→[0,1], and let η(π) denote the expected discounted reward:

$$\eta(\pi) = E_{s_0, a_0, \ldots}\left[\sum_{t=0}^{\infty} \gamma^t r(s_t)\right], \text{ where}$$

$$s_0 : \rho_0(s_0), \, a_t : \pi(a_t \mid s_t), \, s_{t+1} : P(s_{t+1} \mid s_t, a_t).$$

where, $\rho_0$ is the state distribution of the initial state $s_0$. Then, we use the standard definition of the state-action value function $Q_\pi$, the state value function $V_\pi$, and the advantage function $A_\pi$:

$$Q_\pi(s_t, a_t) = E_{s_{t+1}a_{t+1}...}\left[\sum_{l=0}^{\infty}\gamma^l r(s_{t+l})\right],$$

$$V_\pi(s_t) = E_{a_t, s_{t+1}...}\left[\sum_{l=0}^{\infty}\gamma^l r(s_{t+l})\right].$$

$$A_\pi(s, a) = Q_\pi(s, a) - V_\pi(s)$$

Further, it is derived an expression for the expected return of the another policy $\tilde{\pi}$ in terms of advantage over $\pi$, accumulated over timesteps:

$$\eta(\tilde{\pi}) = \eta(\pi) + E_{s_0, a_0, ..., \tilde{\pi}}\left[\sum_{t=0}^{\infty}\gamma^t A_\pi(s_t, a_t)\right] = \eta(\pi) + \sum_s \rho_{\tilde{\pi}}(s)\sum_a \tilde{\pi}(a|s)A_\pi(s, a) \quad (1)$$

A local approximation to $\eta(\tilde{\pi})$ can then be obtained by making an approximation of the state-visitation frequency using the policy $\pi$ which is expressed as $$L_\pi(\tilde{\pi}) = \eta(\pi) + \sum_s \rho_\pi(s)\sum_a \tilde{\pi}(a|s)A_\pi(s, a).$$

An algorithm can be presented to maximize $L_\pi(\tilde{\pi})$ using a constrained optimization approach. For simplicity, we denote $L_\pi(\tilde{\pi})$ as $L_{\theta_{old}}(\theta)$, where $\theta$ represents the policy parameters.

Trust Region Policy Optimization (TRPO)

In this section, we first describe the original TRPO problem and then we present our proposed method to contrast the difference in the optimization techniques. Using several simplifications to the conservative iteration, a practical algorithm can be expressed for solving the policy gradient problem using generalized advantage estimation. In the TRPO, the following constrained problem is solved at every iteration:

maximize $L_{\theta_{old}}(\theta)$ subject to $\bar{D}_{KL}(\theta_{old}, \theta) \leq \delta$ where $L_{\theta_{old}}(\theta)$ is the following term.

$$L_{\theta_{old}}(\theta) = \sum_s \rho_{\theta_{old}}(s)\sum_a \pi_\theta(a|s)A_{\pi_{\theta_{old}}}(s, a)$$

For simplicity of notation, we will denote $L_{\theta_{old}}(\theta)$ as $L(\theta)$ in the following text. The optimization algorithm in TRPO works in two steps: (1) compute a search direction, using a linear model of the objective and quadratic model to the constraint; and (2) perform a line search in that direction, ensuring that we improve the nonlinear objective while satisfying the nonlinear constraint. The search direction in TRPO and its variants is $\Delta\theta = \alpha F^{-1}g$ where $g = \nabla L(\theta)$ is gradient of $L(\theta)$ evaluated at $\theta_{old}$ and F is the Fisher information matrix, i.e., the quadratic model to the KL divergence constraint $$\bar{D}_{KL}(\theta_{old}, \theta) = \frac{1}{2}(\theta - \theta_{old})^T F(\theta - \theta_{old})$$

and F is the Hessian of the KL divergence estimation evaluated at $\theta_{old}$.

In contrast, the proposed algorithm approximates the objective by a quadratic model and uses the Dogleg method to compute a step.

Figure 5:
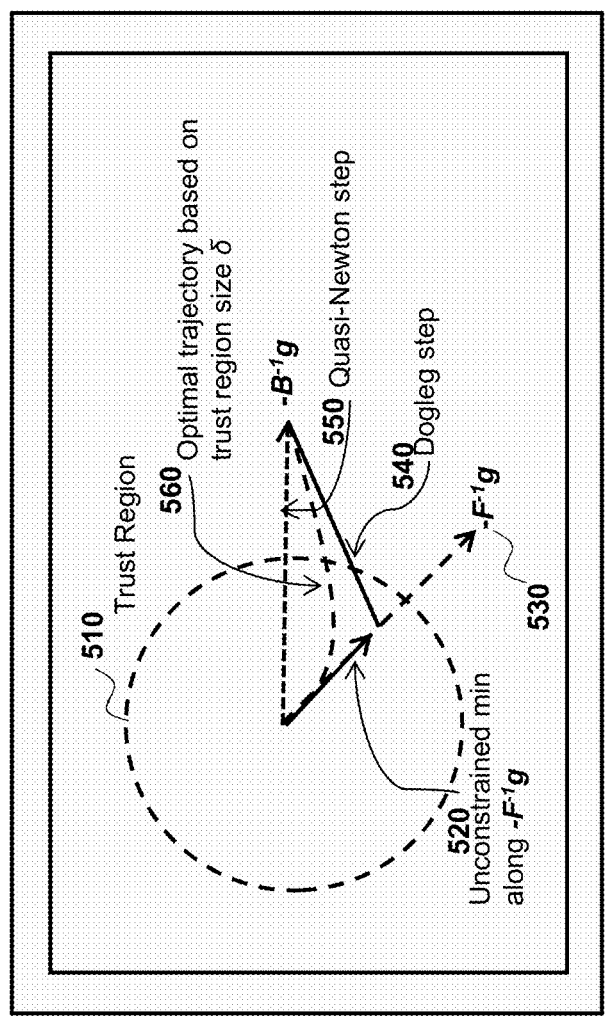
FIG. 5 is a diagram illustrating Exact and Dogleg approximation for Trust Region Optimization, according to some embodiments of the present invention.

FIG. 5 is a diagram illustrating Exact and Dogleg approximation for Trust Region Optimization, according to some embodiments of the present invention.

FIG. 5 depicts the idea behind the Dogleg approximation for the trust region optimum. As seen in the figure, the Dogleg method smoothly transitions between the scaled gradient step and a Quasi-Newton step, which is the unconstrained minimizer of the quadratic model.

Thus, the step automatically changes direction depending on the size of the trust region. The size of the trust region is modified according to the accuracy of the quadratic model to ensure global convergence of the algorithm.

FIG. 6 shows an algorithm describing the exact and dogleg approximation for the trust region optimization, according to embodiments of the present invention, according to embodiments of the present invention.

Quasi-Newton Trust Region Method (QNTRM)

FIG. 7 is an algorithm describing QNTRM for the trust region optimization, according to embodiments of the present invention. QNTRM has three distinctive elements that sets it apart from TRPO. First, the use of a quadratic approximation for the objective via a Quasi-Newton approximation of the Hessian. Second, the Dogleg method that defines the step. Finally, the adaptive change of the stepsize through the classical trust region framework. We describe each of these in the following. In the rest of the paper, let $f(\theta) = -L(\theta)$ so that maximization of $L(\theta)$ can be equivalently expressed as minimization of $f(\theta)$. We use $\theta_k$ to refer to the value of the parameters at the k-th iterate of the algorithm. For sake of brevity, $f_k$ denotes $f(\theta_k)$, $\nabla f_k$ denotes $\nabla f(\theta_k)$ and $\nabla^2 f_k$ denotes $\nabla^2 f(\theta_k)$.

Quadratic Approximation via BFGS

QNTRM approximates the objective using a quadratic model $f_k^q(\theta)$ defined as $$f_k^q(\theta) = f_k + \nabla f_k^T(\theta - \theta_k) + \frac{1}{2}(\theta - \theta_k)^T B_k(\theta - \theta_k)$$

where $B_k \approx \nabla^2 f_k$ is an approximation to the Hessian of f at the point $\theta_k$. We employ the BFGS approximation to obtain $B_k$. Starting with an initial symmetric positive definite matrix $B_0$, the approximation $B_{k+1}$ for $k \geq 0$ is updated at each iteration of the algorithm using the step $s_k$ and $y_k = \nabla f(\theta_k + s_k) - \nabla f_k$ is a difference of the gradients of f along the step. The update $B_{k+1}$ is the smallest update (in Frobenius norm $\|B - B_k\|_F$) to $B_k$ such that $B_{k+1}s_k = y_k$ (i.e. the secant condition holds), and $B_{k+1}$ is symmetric positive definite, i.e.

$$B_{k+1} = \arg\min_B \|B - B_k\|_F \text{ subject to } Bs_k = y_k, B = B^T$$

The above minimization can be solved analytically and the update step is $$B_{k+1} = B_k - \frac{B_k s_k s_k^T B_k}{s_k^T B_k s_k} + \frac{y_k y_k^T}{y_k^T s_k} \quad (2)$$

Observe the effort involved in performing the update is quite minimal. The above update does not enforce positive definiteness of $B_{k+1}$. By recasting (2) after some algebraic manipulation as $$B_{k+1} = \left(I - \frac{1}{s_k^T B_k s_k} B_k s_k s_k^T\right) B_k \left(I - \frac{1}{s_k^T B_k s_k} s_k s_k^T B_k\right) + \frac{y_k y_k^T}{y_k^T s_k}$$

it is easy to see that $B_{k+1}$ is positive definite as long as $y_k^T s_k > 0$.

Quadratic Approximation for Large Problems Using Limited Memory—BFGS

Limited-memory quasi-Newton methods are useful for solving large problems whose Hessian matrices cannot be computed at a reasonable or are not sparse. These methods maintain simple and compact approximations of the Hessian matrices: instead of storing fully dense n×n approximations.

The search direction in QNTRM $\Delta\theta_k$ is computed by approximately solving $$\min_{\Delta\theta} f_k^q(\theta_k + \Delta\theta) \text{ subject to } (\Delta\theta)^T F_k (\Delta\theta) \leq \delta_k$$

i.e. minimizing the quadratic model of the objective subject to the Kullback-Leibler (KL)-divergence constraint. The above problem is only solved approximately since the goal is only to produce a search direction $\Delta\theta_k$ that furthers the overall objective of minimizing $f(\theta)$ at moderate computational cost. However, the search direction $\Delta\theta_k$ should incorporate both the curvature and attain sufficient progress towards solution, in fact at least as much progress as the step in TRPO. The Dogleg method does precisely this by combining the scaled gradient direction $\Delta\theta_k^{GD} = -\beta_k F_k^{-1} \Box f_k$ and the QN direction $\Delta\theta_k^{QN} = -B_k^{-1} \nabla f_k$. The search direction $\Delta\theta_k^{DL}$ is obtained using Algorithm 1 in FIG. 6.

The algorithm first computes the QN direction $\Delta\theta_k^{QN}$ and accepts it if the trust region constraint defined by the KL-divergence holds (Step 3). If not the algorithm computes the scaled gradient direction (Step 3) and a stepsize $\beta_k$ so as to minimize the quadratic model, i.e.

$$\beta_k = \frac{\nabla f_k^T F_k^{-1} \nabla f_k}{\left(F_k^{-1} \nabla f_k\right)^T B_k \left(F_k^{-1} \nabla f_k\right)}. \quad (3)$$

Unlike the TRPO, observe that due to the curvature in the objective we can now define an optimal stepsize for the gradient direction. If the gradient direction scaled by the optimal stepsize exceeds the trust region then it is further scaled back until the trust region constraint is satisfied and accepted (Step 3). If neither of the above hold then the direction is obtained as a convex combination of the two directions $\Delta\theta(\tau_k) := (\Delta\theta_k^{GD} + \tau_k(\Delta\theta_k^{QN} - \theta_k^{GD}))$. This is the Dogleg direction. The parameter $\tau_k$ is chosen so that the direction $\Delta\theta(\tau_k)$ satisfies the trust region constraint as an equality (Step 3.2). The computation of $\tau_k$ requires finding the roots of a quadratic equation which can be obtained easily.

Note that QNTRIVI requires the solution of linear system in order to compute $B_k^{-1} \nabla f_k$ and $F_k^{-1} \nabla f_k$. Both of these can be accomplished by the Conjugate Gradient (CG) method since $B_k, F_k$ are both positive definite. Thus, the computation QNTRM differs from TRPO by an extra CG solve and hence, comparable in computational complexity.

FIG. 8 shows an algorithm for performing a Quasi-Newton Trust Region Method (QNTRM) indicated as algorithm 2, according to some embodiments of the present invention.

QNTRM combines the curvature information from QN approximation and Dogleg step within the framework of the classical trust region algorithm. The algorithm is provided in Algorithm 2 and incorporates safeguards to ensure that $B_k$'s are all positive definite. At each iteration of the algorithm, a step $\Delta\theta_k^{DL}$ is computed using Algorithm 2 (Step 3). The trust region algorithm accepts or rejects the step based on a measure of how well the quadratic model approximates the function f along the step $\Delta\theta_k^{DL}$. We use as measure the ratio of the actual decrease in the objective and the decrease that is predicted by the quadratic model (Step 3.3). If this ratio $v_k$ is close to or larger than 1 then the step computed using the quadratic model provides a decrease in f that is comparable or much better than predicted by the model. The algorithm uses this as an indication that the quadratic model approximates f well. Accordingly, if the ratio (Step 3) is larger than a threshold ($\underline{v}$), the parameters are updated (Step 3). If in addition, the ratio is larger than $\bar{v}$ and $\Delta\theta_k$ satisfies the trust region size as an equality then the size of the trust region is increased in the next iteration (Step 3). This condition indicates that the quadratic model matches the objective f with high accuracy and that the progress is being impeded by the size of the trust region. Hence, the algorithm increases the trust region for the next iteration. With the increased trust region size the algorithm promotes the possible acceptance of a direction other than the scaled gradient direction. On the other hand, if the ratio is below $\underline{v}$ then the computed direction is rejected (Step 3) and the size of the trust region is decreased (Step 3). This reflects the situation that the quadratic model does not the capture the objective variation well. Note that as the size of the trust region decreases the performance of the algorithm mirrors that of TRPO very closely. Thus, QNTRM is naturally designed to be no worse than the TRPO and often surpass TRPO's performance whenever the quadratic model approximates the objective function well. Finally, we update the QN approximation whenever the $s_k^T y_k$ is greater than a minimum threshold. This ensures that the matrices $B_k$ are all positive definite (Step 3). Note that this safeguard is necessary since the Dogleg step cannot be designed to ensure that $s_k^T y_k > 0$.

FIG. 8 shows an algorithm for performing a Quasi-Newton Trust Region Policy Optimization (QNTRPO) indicated as algorithm 3, according to some embodiments of the present invention. QNTRPO is the trust region algorithm that we propose in this paper for policy optimization, The algorithm differs from TRPO in the step that is computed at every iteration of policy iteration. For completeness of the paper, it is presented as an Algorithm 3. It is noted that the only difference between QNTRPO and TRPO is the way the trust region optimization problem is solved (see line 4 in Algorithm 3). It is noted that in the original TRPO formulation, the line 4 in Algorithm 3 is performed using the scaled gradient method as discussed earlier. This is the major difference between the proposed and the algorithm proposed in TRPO. Note that QNTRM is an iterative procedure and that the step for every iteration of Algorithm 3 is computed by iterating over K steps of QNTRM (see Algorithm 2).

In another embodiment of the invention, the matrix $B_k$ may be represented as a sum of a set of outer products of vectors resulting in a square matrix. The number of such vectors is far fewer than the dimension of the matrix thereby reducing the memory required to store such a representation. This approximation technique can be performed by using the limited-memory Quasi-Newton approximation. This leads to another embodiment of the (QNTRM) where the limited-memory Quasi-Newton approximation is employed instead of the Quasi-Newton approximation. Further, the limited-memory Quasi-Newton approximation lends itself easily to the matrix-vector products that are employed in iterative solution of the linear systems required in the computation of the step in Algorithm 1.

Experimental Results

In this section, we present experimental results for policy optimization using several different environments for continuous control from the openAI Gym benchmark. In these experiments, we try to answer the following questions:
1. Can QNTRPO achieve better learning rate (sample efficiency) than TRPO consistently over a range of tasks?
2. Can QNTRPO achieve better performance than TRPO over a range of tasks in terms of average reward?

In the following, we try to answer these two questions by evaluating our algorithm on several continuous control tasks.

FIGS. 9A, 9B, 9C and 9D are simulation results for example benchmarks for the trust region optimization, according to embodiments of the present invention.

In particular, we investigated and present results on four different continuous control environments in Mujoco physics simulator. We implemented four locomotion tasks of varying dynamics and difficulty: Humanoid, Half-Cheetah, Walker and Hopper. The goal for all these tasks is to move forward as quickly as possible. These tasks have been proven to be challenging to learn due to the high degrees of freedom of the robots. A great amount of exploration is needed to learn to move forward without getting stuck at local minima. During the initial learning stages, its very easy for the algorithm to get stuck in a local minimum as the controls are penalized and the robots have to avoid falling. FIG. 10 shows the dimension or size of the benchmark problems shown in the present invention to show the sample efficiency of the optimization method. A list of the state and action dimension of these tasks is shown in FIG. 10.

Further, embodiments according to the present disclosure provide effective method for performing the multimodal fusion model, thus, the use of a method and system using the multimodal fusion model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A computer-implemented learning method for optimizing a control policy controlling a system, comprising:
   receiving, via an input/output interface connected to sensors equipped on the system, states of the system being operated for a specific task to be learned using the policy optimization method, wherein the states of the system are measured by the sensors;
   initializing the control policy as a function approximator including neural networks;
   collecting data of state, action and next state tuples using a current control policy;
   estimating an advantage function and a state visitation frequency based on the current control policy;
   estimating Kullback-Leibler-divergence constraint (KL-divergence constraint) and the surrogate objective function as a function of the policy parameters;
   updating the current control policy based on the estimated constraint and the surrogate objective function using a quasi-newton trust region policy optimization (QNTPRO);
   determining an optimal control policy, for controlling the system, based on the expected average reward accumulated using the updated current control policy;
   generating a control command based on the optimal control policy; and
   operating the system according to the optimal control policy by sending a control signal of the control command to the system.

2. The method of claim 1, wherein the collecting, the estimating and the updating are iteratively performed until the value of the average reward from different episodes of the policy reach a steady-state and converge to an unknown value.

3. The method of claim 1, wherein the advantage function $A_\pi$ is represented by a state-action value function $Q_\pi$ and a state value function $V_\pi$.

4. The method of claim 3, wherein the advantage function is expressed by $$A_\pi(s, a) = Q_\pi(s, a) - V_\pi(s),$$

where s is a state of the system and a is an action.

5. The method of claim 1, wherein a BFGS quasi-Newton method is used to estimate the Hessian of an objective function.

6. The method of claim 1, where in a L-BFGS quasi-Newton method is used to approximately keep an estimate the Hessian of an objective function for problems of large size.

7. The method of claim 1, wherein QNTPRO obtains policy parameters $\theta^i$ to maximize an objective function for an episode.

8. The method of claim 1, wherein QNTPRO uses a Dogleg method for computing an optimal step direction and size.

9. The method of claim 1, wherein QNTRPO uses a trust-region method to accept or reject a step computed by the Dogleg method in an iterative fashion using the quadratic approximation of the objective function.

10. A controller for controlling a system by optimizing a control policy, comprising:
- an interface configured to receive action and states of the system via sensors equipped on the system;
- a memory to store computer-executable programs including a policy initializer, a policy collector or storage, an estimator, an agent and a policy-update program, a Quasi-Newton approximation program for Hessian of the objective function, a Dogleg method for computing the optimization step, and a trust-region method to find the next estimate of the policy parameters using the Hessian approximation of the objective function; and
- a processor, in connection with the memory, configured to initialize the control policy as a function approximator including neural networks;
- collect data with respect to the states using a current control policy;
- estimate an advantage function and a state visitation frequency based on the current control policy;
- update the current control policy based on the collected data using a quasi-newton trust region policy optimization (QNTPRO);
- determine an optimal control policy, for controlling the system, based on a value average reward accumulated using the updated current control policy;
- generate a control command based on the optimal control policy; and
- operate the system according to the optimal control policy by sending a control signal of the control command to the system.

11. The controller of claim 10, wherein the data collection, estimation and the updates are iteratively performed until the value the average reward per episode of the policy reaches a steady state at some unknown value.

12. The controller of claim 10, wherein the advantage function $A_\pi$ is represented by a state-action value function $Q_\pi$ and a state value function $V_\pi$.

13. The controller of claim 10, wherein the advantage function is expressed by $$A_\pi(s, a) = Q_\pi(s, a) - V_\pi(s),$$

where s is a state of the system and a is an action (or control signal).

14. The controller of claim 10, wherein a BFGS quasi-Newton method is used to estimate the Hessian of an objective function of the policy gradient optimization.

15. The controller of claim 10, wherein a L-BFGS quasi-Newton method is used to approximately keep an estimate the Hessian of an objective function for problems of large size.

16. The controller of claim 10, wherein QNTPRO obtains policy parameters $\theta^i$ to maximize an objective function for an episode.

17. The controller of claim 7, wherein QNTPRO uses a Dogleg method computing an optimal step direction and size.

18. The controller of claim 10, wherein QNTRPO uses a trust-region method to accept or reject a step computed by the Dogleg method in an iterative fashion using the quadratic approximation of the objective function.

19. A controller for controlling a system by optimizing a control policy, comprising:
- an interface configured to receive action and states of the system via sensors equipped on the system;
- a memory to store computer-executable programs including a policy initializer, a policy collector or storage, an estimator, an agent and a policy-update program, a limited-memory Quasi-Newton approximation program for Hessian of the objective function, a Dogleg method for computing the optimization step, and a trust-region method to find the next estimate of the policy parameters using the Hessian approximation of the objective function; and
- a processor, in connection with the memory, configured to initialize the control policy as a function approximator including neural networks;
- collect data with respect to the states using a current control policy;
- estimate an advantage function and a state visitation frequency based on the current control policy;
- update the current control policy based on the collected data using a quasi-newton trust region policy optimization (QNTPRO); and
- determine an optimal control policy, for controlling the system, based on a value average reward accumulated using the updated current control policy;
- generate a control command based on the optimal control policy; and
- operate the system according to the optimal control policy by sending a control signal of the control command to the system.

20. The controller of claim 19, wherein the data collection, estimation and the updates are iteratively performed until the value the average reward per episode of the policy reaches a steady state at some unknown value.

21. The controller of claim 19, wherein the advantage function $A_\pi$ is represented by a state-action value function $Q_\pi$ and a state value function $V_\pi$.

22. The controller of claim 19, wherein the advantage function is expressed by $$A_\pi(s, a) = Q_\pi(s, a) - V_\pi(s),$$

where s is a state of the system and a is an action (or control signal).

23. The controller of claim 19, wherein a BFGS quasi-Newton method is used to estimate the Hessian of an objective function of the policy gradient optimization.

24. The controller of claim 19, wherein a L-BFGS quasi-Newton method is used to approximately keep an estimate the Hessian of an objective function for problems of large size.

25. The controller of claim 19, wherein QNTPRO obtains policy parameters $\theta^i$ to maximize an objective function for an episode.

26. The controller of claim 25, wherein QNTPRO uses a Dogleg method computing an optimal step direction and size.

27. The controller of claim 19, wherein QNTRPO uses a trust-region method to accept or reject a step computed by the Dogleg method in an iterative fashion using the quadratic approximation of the objective function.

* * * * *